J. F. GOODWIN.
MEANS FOR ADJUSTING A VEHICLE SPRING TO VARIOUS LOADS.
APPLICATION FILED NOV. 4, 1916.

1,229,254.

Patented June 12, 1917.
3 SHEETS—SHEET 1.

Inventor:
John F. Goodwin
by his attorney
Charles F. Richardson

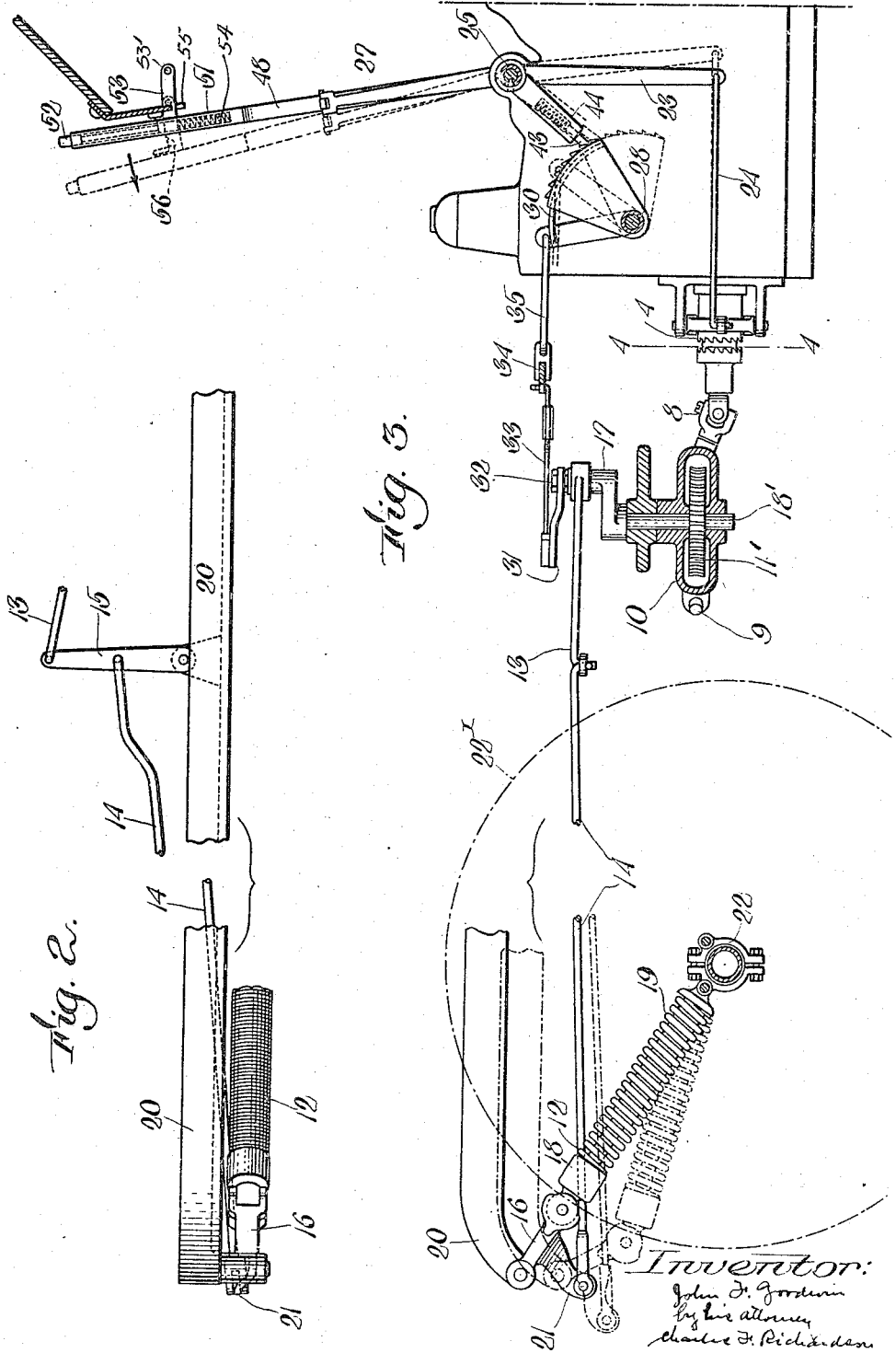

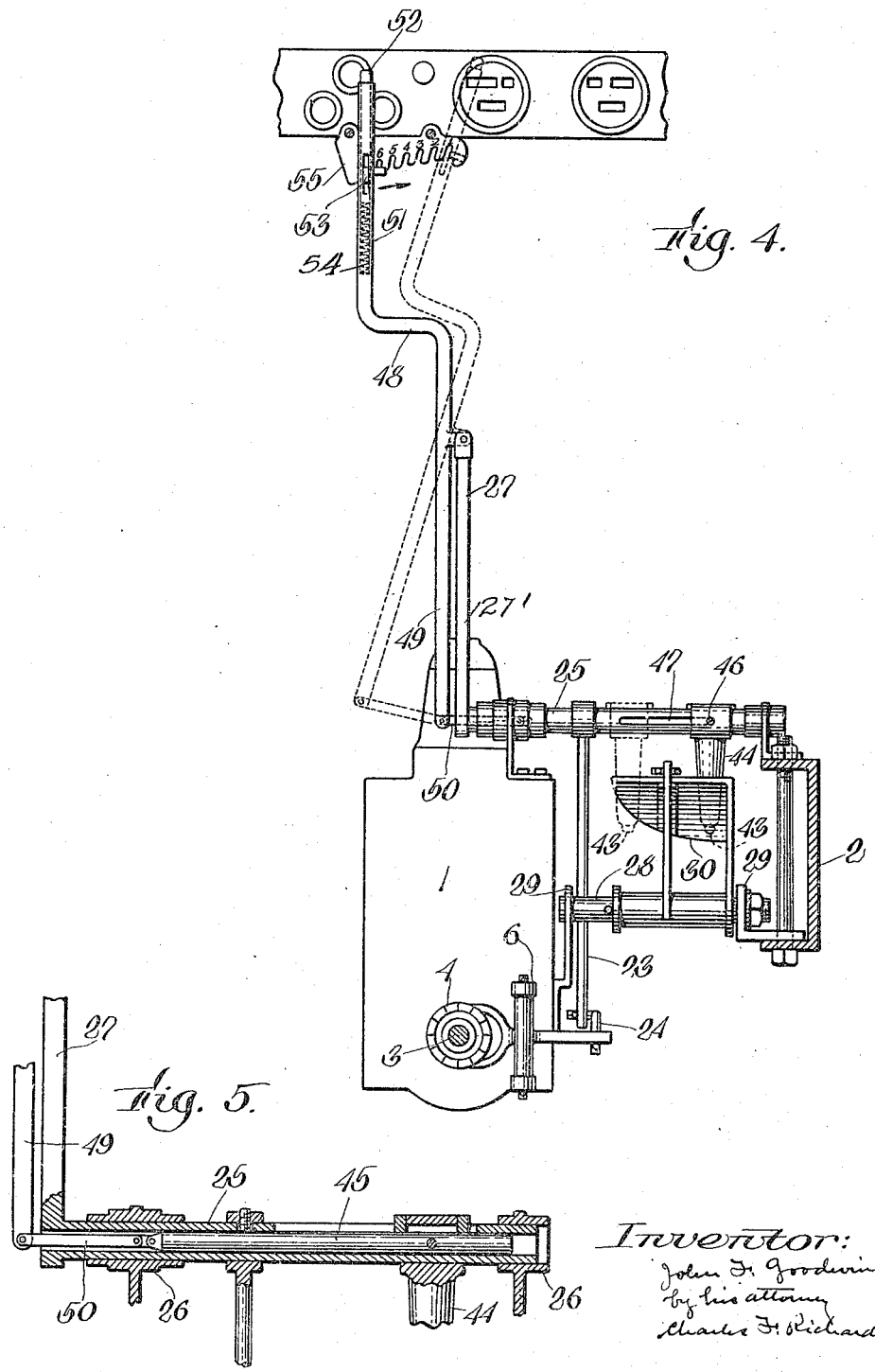

UNITED STATES PATENT OFFICE.

JOHN F. GOODWIN, OF CHARLESTOWN, MASSACHUSETTS, ASSIGNOR TO SARAH N. EASTMAN, SPECIAL ADMINISTRATRIX OF WILLIAM E. EASTMAN, DECEASED.

MEANS FOR ADJUSTING A VEHICLE-SPRING TO VARIOUS LOADS.

1,229,254.   Specification of Letters Patent.   Patented June 12, 1917.

Application filed November 4, 1916. Serial No. 129,624.

*To all whom it may concern:*

Be it known that I, JOHN F. GOODWIN, citizen of the United States, residing at Charlestown, in the county of Suffolk, and State of Massachusetts, have invented certain new and useful Means for Adjusting Vehicle-Springs to Various Loads, of which the following is a specification, reference being had therein to the accompanying drawings.

My invention resides in controlled power-operated means to vary the normal relations between a vehicle body and its spring, to reduce to a minimum, the jolting and rolling movements of the vehicle body carrying any particular load.

While it is designed and illustrated for use in connection with the type of spring disclosed in United States Letters Patent No. 1,167,054 issued to William E. Eastman, January 4, 1916, its use is not, necessarily, to be so limited.

In the drawings illustrating the principle of my invention and the best mode now known to me of embodying the same in operating structure, Figures 1 and 2 combined, constitute a plan of my invention.

Fig. 3 is an elevation thereof, the worm-gearing being shown in section on line 3—3, Fig. 1.

Fig. 4 is an enlarged end-view of so much of the apparatus as appears at the right of the line 4—4, Fig. 3; while Fig. 5 shows in longitudinal section, the main arbor of the clutch-control mechanism.

Figure 1:
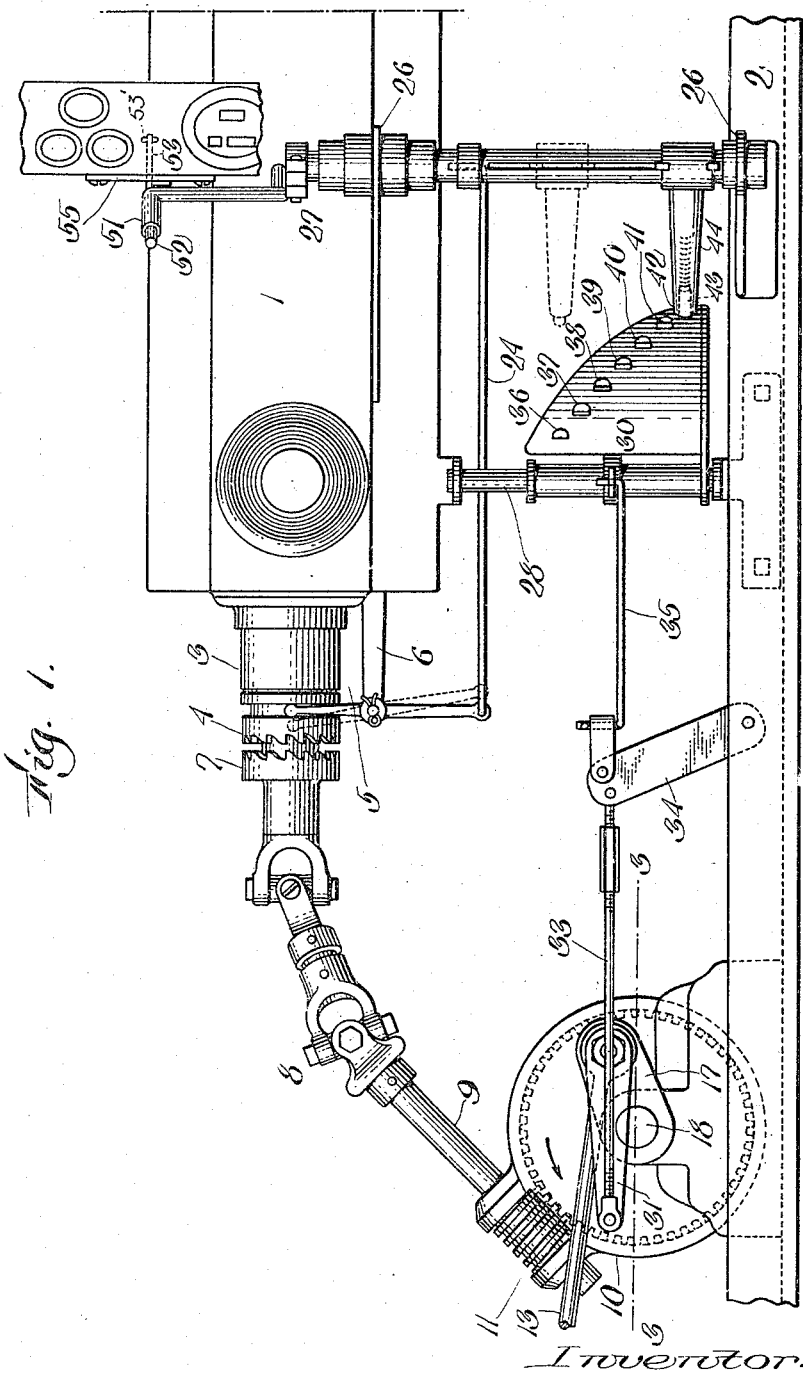

An internal combustion engine 1, Fig. 1, is supported upon the forward part of an automobile frame 2, in any well-known manner. The power to be employed is, in this particular instance, derived from the jack-shaft 3, always turning with the engine, and having thereon a longitudinally movable clutch member 4 operated by a yoke-lever 5 pivoted to a bracket 6 on the engine case. A corresponding clutch member 7, through two toggle joints 8, operates a worm-shaft 9 having suitable bearings in a support 10 fixed to a side of the automobile frame 2. A worm gear 11, horizontally disposed in said support 10, meshes with the worm shaft, and is operatively connected to the movable end of a coil spring 12, Figs. 2 and 3, serving as an element of the automobile spring, by means of links 13, 14, and levers 15, 16, and a crank-arm 17 secured to the worm-gear arbor 18'.

The coil spring 12 is confined between two abutting members 18, 19, Fig. 3, one slidingly mounted within the other, as is clearly shown in the above mentioned Letters Patent; the former 18, being pivotally connected with the end portion of the automobile side bar 20, by the lever 16 having a pressure control arm 21 extending laterally therefrom, and pivoted to the free end portion of the link 14, of the series operated by the rotatable worm-wheel 11'. The other abutting member 19 is pivotally secured to the axle 22 of the wheel $22^x$.

To operate the clutch member 4, manually, a lever arm 23, Figs. 3, 4 and 5, connected with the clutch yoke 5 by a link 24, is fixed to a hollow arbor 25, Fig. 5, having suitable bearings 26 respectively upon the engine case and side bar, and is moved forward and back by an upwardly extending hand lever 27 whose arm 27' is fixed to the arbor 25.

That the clutch may automatically disconnect the engine from, and lock, the spring-control apparatus whenever the spring has any one of the required predetermined positions required for certain loads, the following described mechanisms are provided: A horizontal shaft 28 having bearings 29, Fig. 4, upon the engine case and the side bar of the automobile frame, supports a curved plate 30 which is given a complete forward and back movement for each revolution of the worm-gear 11, by means of an arm 31 rigidly fixed to the pin 32 of the crank arm 17 on the worm gear 11; a link 33, an arm 34, pivoted to the side bar, and a second link 35. In the surface of this plate 30, Fig. 1, are fixed a series of position-selecting pins, say, 36 to 42 inclusive, lying in parallel vertical planes; the circumferential location of each pin being determined by the normal horizontal position of a catch member 43, Figs. 1 and 3, of the clutch control, and the position in which the worm-gear is, corresponding to the desired position of the vehicle-spring. In other words, when the vehicle-spring and worm-gear are in a predetermined position for any certain load, the selecting pin, as 42, which is automatically to control the clutch and disconnect the power from the spring-control apparatus and thus leave the latter in that position, must be in engagement with the catch member 43. This member is longitudinally mounted and spring controlled, in an arm 44 slidable along the hollow arbor 25, and moved by means of a rod 45, Fig. 5, within the arbor, and connected to the arm by a pin 46 movable in a longitudinal slot 47, Fig. 4, in the arbor. To bring about this movement, a manually operated position-selecting lock-lever is employed. It comprises the hand-lever 48, which is pivoted centrally to the arm 27' has its free end-portion 49 connected by a link 50 to the rod 45 within the arbor 25; and has mounted within its opposite end or hand portion 51, a finger-press lock-member 52 with a locking guide-bolt 53 having a release notch 56 and protruding forward through a slot in said member and pressed upwardly by a coil spring 54 within the lever handle. A selecting lock-plate 55 is fixed to the dashboard of the automobile, and is provided with a series of selecting notches for the bolt to engage. These notches correspond respectively with the series of position-selecting pins 36—42, in the vibrating plate 30, and are so positioned that when the lock-bolt 53 is in any particular notch, the catch 43 will be in the path of movement of its respective selecting pin. The selecting notches here shown are numbered 1, 2, 3, 4, 5, 6, 7, and correspond to the normal spring positions required for 1, 2, 3, 4, 5, 6, or 7 passengers, and when any one pin is engaged by the catch, the clutch will, by the arrangement of the clutch controlled parts, become, as will later more fully appear, disconnected from the source of power, when the normal angular position of the vehicle spring in relation to the frame, required for the number of passengers, is reached; and will leave the spring there, until the power is again applied.

In the drawings, the mechanism is shown as at rest and properly set for the coil spring to bring about easy riding for seven passengers. To explain the operation of my invention, I will assume that the car is to carry only one passenger.

The position-selecting lock-lever 48, Figs. 3 and 4, is grasped by the hand, the thumb pressing the finger-press lock-bolt 52, so that the release slot 56 will be below the points of the selecting notches, the rear top portion of the bolt, however, always being above them. The selecting lever is then moved to the right until, as shown, the slot of the lock-bolt is below the notch marked 1, when the thumb pressed member is released, and the lock-bolt snaps up into the slot, the bottom of the release notch 56 engaging the top of notch 1; the selecting lever, arm 44 and catch 43, assuming the dotted positions shown in Fig. 4. Next, the finger-press lock-bolt is again depressed by the thumb, and the selecting lever is pulled toward the operator, it being guided in its movement by the engagement of the top edge portion of the bolt 53 with the selecting notch 1, as seen in Fig. 3; and a pin 53', in the lock-bolt 53, limiting the forward movement by contacting the rear of the locking-plate 55. This results in a rotary movement of the hollow arbor 25 and arm 23, which causes the link 24 and the yoke 5 to move the clutch member 4 on the jack-shaft 3, into locking engagement with the corresponding clutch member 7, operating the positioning apparatus, and the latter begins to move. But these changes in position of the selecting lever 48, cause the catch 43 to move to the left into the vertical plane or path of the selecting pin, say 36, Fig. 1, positioned to automatically fix the spring position necessary when one passenger is carried. As already stated, the spring positioning apparatus is now moving, in the direction of the arrows, the worm-gear 11 being rotated by the toggle joints 8, and the worm-wheel 11' by the gear, at a very much reduced speed. As the worm-wheel moves ahead until the link 13 crosses the center of the wheel, the angle between the vehicle body and the coil spring diminishes; the links 13 and 14 causing the arm 21, on the lever 16 connecting the end of the side bar and the outer abutment member 18, to move the axis of the lever and that of the coil spring out of line. After the link 13 has passed the center, the said operated links and arm move in an opposite direction, and the said angle of the spring begins to increase for the next half revolution of the worm-wheel. Meanwhile, the link 33 pivoted to the power selecting arm 31 on the worm-wheel, is, through the lever 34, and connecting link 35, moving the selecting plate 30 with its selecting pin 36 toward the catch 43 of the clutch control. The plate carries the pin under and past the catch a slight distance, stops as the selecting link 33, passes the center of the worm-wheel, and then begins to return, but in so doing, the plane faces of the catch and pin engage, and the catch is carried in its path through a sufficient arc to move the arm 44, hollow arbor 25, connected arm 23, link 24, and driving clutch member 4 out of engagement with the driven clutch member 7 operating the spring positioning apparatus; the manual selecting lever moving forward until the bottom of the release notch 56 in the bolt 53 contacts the top of the selecting notch 1. Upon the disengagement of the driving clutch, the spring positioning apparatus stops, the spring is in the position required, and there it remains; the worm-gear preventing any rotary movement of the worm-wheel, due to the pressure transmitted thereto by the vehicle coil spring through the connecting links and arms.

What has been said in reference to the operations required to cause the apparatus to bring about the spring position needed for one person, would obviously apply to the changes demanded to render the spring position suitable for any other of the indicated loads.

Heretofore, this change in normal position of the vehicle spring, has been obtained by various manually operated means. These were slow in action, and much physical labor to use them was expended. My above disclosed power operative means has no such inherent objections. It operates with certainty and quickness, and may be set into action with slight manual exertion.

While I have shown my invention in connection with one spring, it can be applied to two, by various obvious mechanical means, such for example, as are illustrated in said Letters Patent to Eastman.

It is also plain that any suitable source of power, as a steam engine, or an electric motor may be substituted for that shown herein.

Desiring to protect my invention in the broadest manner legally possible,

What I claim is—

1. In a power-driven vehicle, a metal vehicle-spring; a power motor; means operatively connecting said spring and said motor, to control the relations between said spring and said vehicle; and means to automatically disconnect said motor from said operatively connecting means, whenever said spring moves into a predetermined position.

2. In a power-driven vehicle, a vehicle-spring; a power motor; means to transform the rotary power of said motor to longitudinal power; means to connect said spring with said latter means; clutch mechanism to connect and to disconnect said motor from said driven means; and automatic means whereby said clutch mechanism may be disconnected from said driven means when the spring has attained a certain predetermined position.

3. In a power-driven vehicle, a spring; a motor-driven shaft; means to convert the rotary movement of said shaft to a reciprocating longitudinal movement; connections between said means and said spring; a pin reciprocated by said means; a pivoted arm having a spring catch to lock with said pin in one of its movements and pass by it in its opposite movement; a clutch to disconnect said shaft from said means; apparatus to connect said pivoted arm with said clutch, whereby said shaft may be automatically disconnected from said means; and manually operated mechanism to connect said clutch with said means and to move said pivoted arm and catch into the path of the reciprocating pin.

4. In a power-driven vehicle, a spring; a motor-driven shaft; means to convert the rotary movement of said shaft to a reciprocating longitudinal movement; connections between said means and said spring; a number of pins, each reciprocated by said means in a plane parallel with that of each of the other pins; a pivoted arm movable in an axis perpendicular to the plane of movement of the pivoted arm, said arm having a spring catch to lock with any one of said pins in one of its movements and to pass by it in its opposite movement; a clutch to disconnect said shaft from said means; apparatus to connect said pivoted arm with said clutch, whereby said shaft may be automatically disconnected from said means; manually operated mechanism to connect said clutch with said means and to move said pivoted arm and catch into the path of any one of the reciprocating pins; and a device for locking said mechanism in a position corresponding to that of the engaging catch and the particularly selected pin.

In testimony whereof I hereunto affix my signature in the presence of two witnesses.

JOHN F. GOODWIN.

Witnesses:
CHARLES F. RICHARDSON,
CHARLES W. HODGDON.

Copies of this patent may be obtained for five cents each, by addressing the "Commissioner of Patents, Washington, D. C."